A. R. JOHNSON.
CORN HEADING DEVICE.
APPLICATION FILED JULY 17, 1912.
1,055,181.
Patented Mar. 4, 1913.
2 SHEETS—SHEET 2.
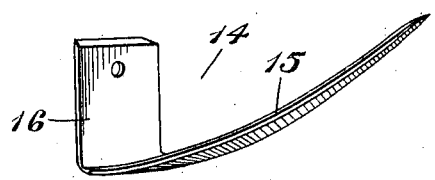
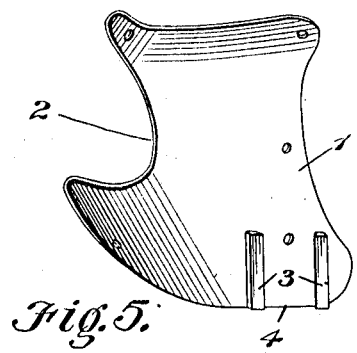
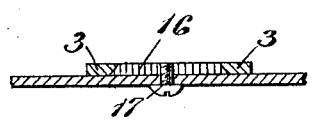
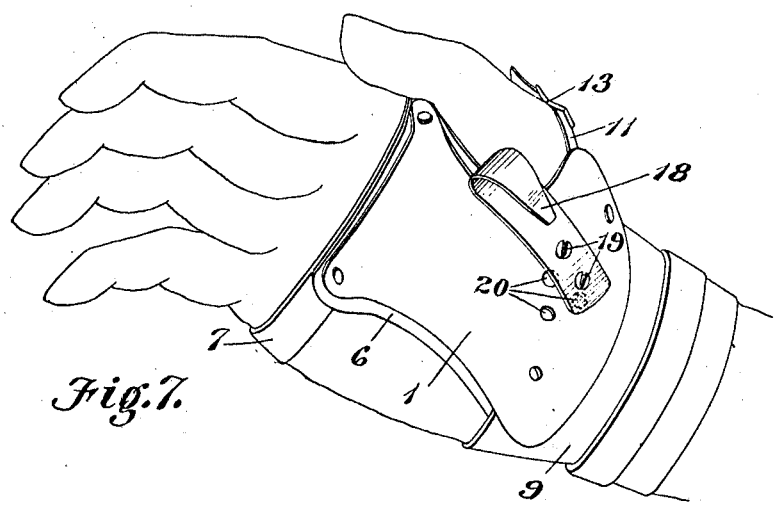
Inventor
A. R. Johnson
By Victor J. Evans
Attorney
Witnesses

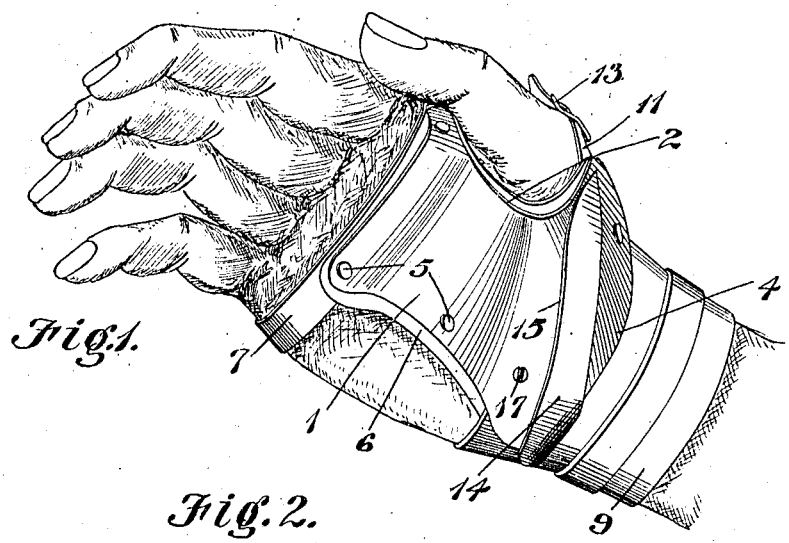
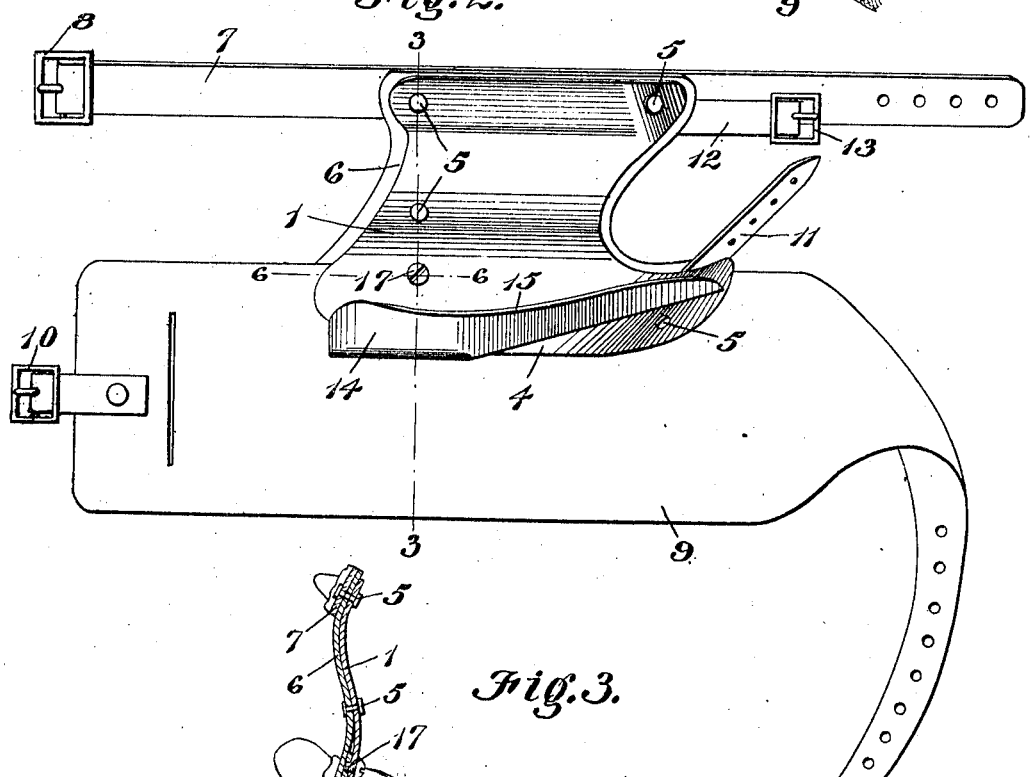
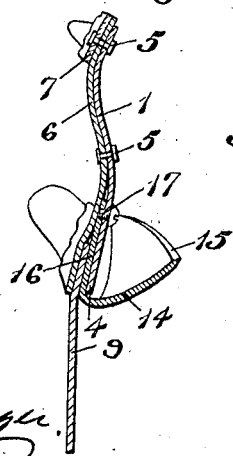

UNITED STATES PATENT OFFICE.

ALVIN R. JOHNSON, OF BOURBON COUNTY, KANSAS.

CORN-HEADING DEVICE.

1,055,181.

Specification of Letters Patent.

Patented Mar. 4, 1913.

Application filed July 17, 1912. Serial No. 709,964.

*To all whom it may concern:*

Be it known that I, ALVIN R. JOHNSON, a citizen of the United States, residing in the county of Bourbon and State of Kansas, have invented new and useful Improvements in Corn-Heading Devices, of which the following is a specification.

This invention relates to corn heading devices, and it has particular reference to a device adapted to be strapped on the hand and wrist of the operator for the purpose of heading Kafir corn and the like.

One object of the invention is to produce a simple and efficient device of the character described including a metallic protecting plate with which a heading blade may be conveniently connected in such a manner as to be readily detachable for the purpose of resharpening the same.

A further object of the invention is to so construct the protecting plate that when the heading blade is detached, a hook may be associated therewith to serve as a corn husking device.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a perspective view showing the improved device in position for use. Fig. 2 is a plan view, showing the outer side of the device. Fig. 3 is a sectional view taken on the line 3—3 in Fig. 2. Fig. 4 is a perspective view, showing the cutting blade or heading blade, detached. Fig. 5 is a perspective view, showing the protecting plate detached, the same being inverted to expose its underside. Fig. 6 is a sectional view taken on the line 6—6 in Fig. 2. Fig. 7 is a perspective view, showing the invention as a husking device.

Corresponding parts in the several figures are denoted by like characters of reference.

The improved device includes a protecting plate 1 formed preferably of sheet metal, and shaped to approximately fit the palm of the hand of the operator; the device being usually fitted to the right hand, although a left handed device may be constructed when desired. The plate 1 has a thumb receiving recess 2, and the underside of the plate is provided with flanges 3 arranged in parallel relation to each other and in an upwardly and outwardly inclined position with reference to the lower edge 4 of the plate which extends across the wrist of the operator.

The protecting plate 1 is secured by means of rivets or other fastening devices 5 on a shield 6 of leather or other suitable material, said shield having at its upper edge a broad band 7 which may be fastened around the ball of the hand of the operator by means of a buckle 8. Connected with the shield adjacent to the lower edge thereof is a wrist encircling band 9 having a buckle 10 at one end, and thumb engaging billets 11, 12, one of which is provided with a buckle 13, are also provided. The rivets or fastening members 5 are arranged in such a manner that none of said fastening members will be disposed between the flanges 3 on the underside of the protecting plate.

The cutting blade or heading blade 14 is provided with an arcuate cutting edge 15, and said blade is provided with a shank 16, bent at a suitable angle thereto and adapted to be guided between the flanges 3 on the underside of the protecting plate, and between said plate and the opposed face of the shield 6, said blade abutting on the lower edge of the plate, thus limiting the upward movement thereof. For the purpose of retaining the blade securely in position, the shank 16 may be engaged by a fastening screw 17 extending through the protecting plate.

It will be seen from the foregoing description, taken in connection with the drawings hereto annexed, that the heading blade may be very readily detached from the device by simply loosening or removing the screw 17, thus enabling the shank 16 to be slid out between the shield and the protecting plate. When the blade is in position, the operator may seize the top of a corn stalk with his thumb and fingers and bend the same down in a position adjacent to the edge of the cutting blade, after which by a simple twist of the wrist, the blade will sever the stem or stalk, leaving the head in the hand of the operator to be disposed of as may be desired.

The blade may be very readily detached for sharpening or other purposes, and when replaced it will be securely held by the single screw 17.

When the cutting blade 14 is detached from the device, a suitably constructed hook 18 may be secured exteriorly on the protecting plate by means of one or more fastening screws 19, said hook being of such a nature that it may be conveniently used for corn husking purposes.

By providing auxiliary apertures, as shown at 20, for the reception of the fastening screws 19, the hook 18 may be adjusted in various positions, thus enabling the operator to select the position which he regards as most advantageous and satisfactory for said hook.

Having thus described the invention, what is claimed as new, is:—

In a device of the character described, a plate shaped to conform to the palm of the hand, said plate being provided with guide flanges on its under surface terminating at its lower edge, a flexible shield having means whereby it may be secured on the hand and wrist of an operator, connecting means whereby the plate is secured on said shield without obstructing the space between the guide flanges, a heading blade having a shank bent at an angle thereto, said shank slidably engaging the guide flanges between the opposed surfaces of the plate and the shield, and said blade abutting on the lower edge of the plate, and fastening means engaging the shank through the protecting plate.

In testimony whereof I affix my signature in presence of two witnesses.

ALVIN R. JOHNSON.

Witnesses:
W. G. JOHNSON,
A. R. SAILORS.

---

Copies of this patent may be obtained for five cents each, by addressing the "Commissioner of Patents, Washington, D. C."